United States Patent [19]

Sakai

[11] 4,210,802

[45] Jul. 1, 1980

[54] BAR CODE SCANNER

[75] Inventor: Toshiyasu Sakai, Kariya, Japan

[73] Assignee: Nippondenso Co., Ltd., Kariya, Japan

[21] Appl. No.: 923,966

[22] Filed: Jul. 12, 1978

[30] Foreign Application Priority Data

Jul. 26, 1977 [JP] Japan ................. 52/89962

[51] Int. Cl.² ........................ G06K 13/06; G06K 7/10
[52] U.S. Cl. .................................. 235/483; 235/462; 235/472
[58] Field of Search ............. 340/146.3 SY; 235/455, 235/483, 484, 485, 462, 463, 466, 472; 35/35, 38; 250/239, 569, 570

[56] References Cited

U.S. PATENT DOCUMENTS

| | | | |
|---|---|---|---|
| 3,673,416 | 6/1972 | Berler | 250/569 |
| 3,735,350 | 5/1973 | Lemelson | 340/146.3 SY |
| 3,780,271 | 12/1973 | Sharkitt | 235/472 |
| 4,114,030 | 9/1978 | Nojiri | 235/464 |

Primary Examiner—Robert M. Kilgore
Attorney, Agent, or Firm—Cushman, Darby & Cushman

[57] ABSTRACT

A bar code scanner for scanning a bar code or bar codes having a plurality of parallel bar symbols recorded in contrastive light reflection colors on a record medium. The scanner has an image sensor comprising a plurality of light responsive elements which are arranged in a straight line and activated one by one. The image sensor is supported within a casing which is carried close to the record medium. The casing is provided with a pair of parallel side guide members which extends orthogonally relative to the light responsive elements to define a scanning region. The parallel side guide members are connected by a transversal guide member which defines a scanning line at the end portions of the parallel side guide members.

5 Claims, 6 Drawing Figures

BAR CODE SCANNER

BACKGROUND OF THE INVENTION

The present invention relates to a bar code scanner for scanning a bar code or bar codes by an image sensor which is activated electronically.

In a bar code scanning system it is known that a plurality of parallel bar symbols constituting a bar code or bar codes are scanned by an image sensor. As having been suggested in the United States patent application Ser. No. 668,036, filed on Mar. 18, 1976, now U.S. Pat. No. 4,140,271, and assigned to the same assignee as this invention, the image sensor having a plurality of light responsive elements arranged in a straight scanning line is prepared and a record medium recorded with the parallel bar symbols is moved relative to the image sensor such that the parallel bar symbols moves in a direction transverse to the straight scanning line of the image sensor. With periodic clock pulses being applied to activate the light responsive elements one by one, the image sensor scans the parallel bar symbols along the straight scanning line. It is a great advantage of this arrangement that, since the scanning speed is kept electronically at a constant speed, scanning results are almost immune against changes in the moving speed of the record medium.

SUMMARY OF THE INVENTION

It is a primary object of the invention to improve the abovedescribed scanning arrangement.

It is a further object of the invention to provide a bar code scanner which is portable and enables operators to recognize a scanning region with ease.

It is a still further object of the invention to provide a bar code scanner which is portable and enables operators to recognize a scanning line with ease.

DETAILED DESCRIPTION OF THE PREFERRED EMBODIMENTS

Figure 1:
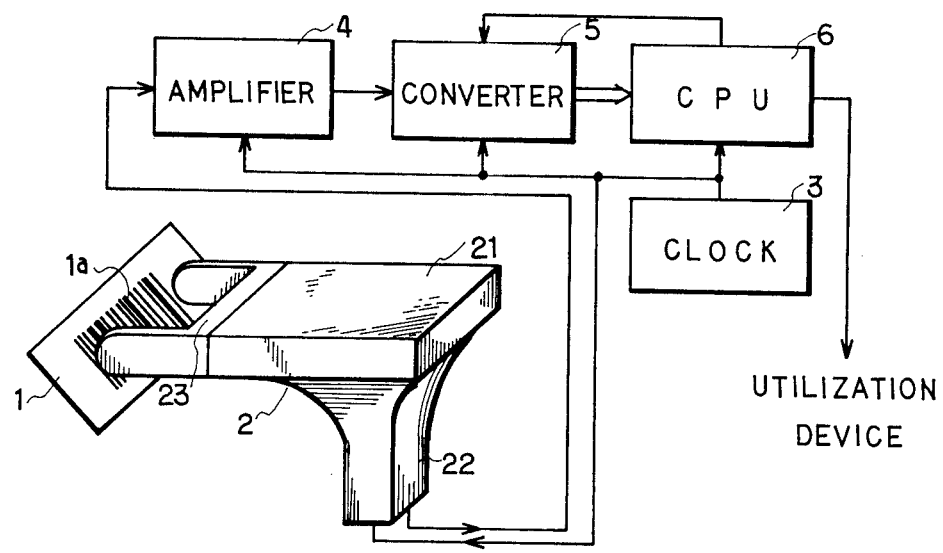
FIG. 1 is a schematic view illustrating the first embodiment of a bar code scanner according to the invention.

Referring first to FIG. 1 illustrating the first embodiment, a record medium 1 bearing a bar code or bar codes 1a recorded thereon is shown in association with a bar code scanner 2 which primarily comprises a rectangular casing 21, a grip 22 fixed to the bottom portion of the casing 21 and a guide 23 engaged with the side portion of the casing 21. The scanner 2 is connected to associated electronic circuits, a clock generator 3, an amplifier 4, a signal converter 5 and a central processing unit 6, through electrical leads. As to detail constructions and functions of these electronic circuits which are not essential to this invention, reference can be made to the United States patent application Ser. No. 668,036 filed on Mar. 18, 1976, now U.S. Pat. No. 4,140,271, and assigned to the same assignee as this invention. Therefore no further description is necessary with regard to the electronic circuits. It should be noted however that all of or some of the clock generator 3, the amplifier 4 and the signal converter 5, may be encased within the casing 21 or the grip 22 of the scanner 2.

Figure 2A:
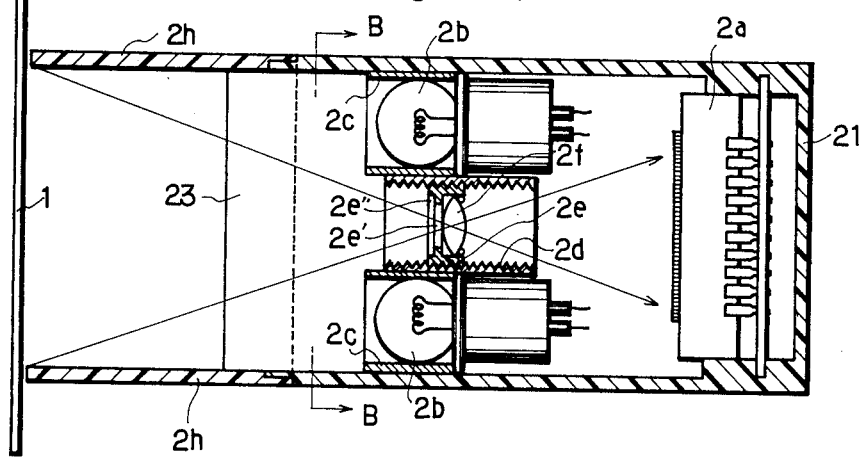
FIGS. 2A and 2B are sectional views of a bar code scanner illustrating the inside structures along the respective lines B—B and A—A in FIGS. 2B and 2A.
Figure 2B:
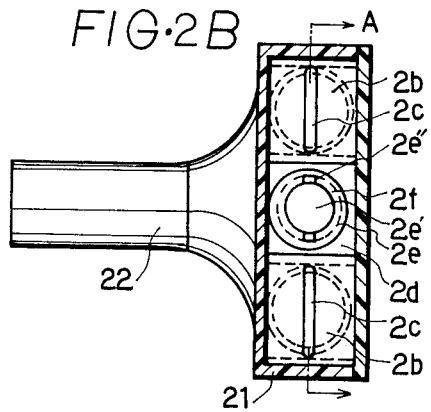

As shown in FIGS. 2A and 2B, particularly in FIG. 2A, an image sensor 2a having a plurality of light responsive elements such as photo diodes arranged in a straight line to face the open side of the casing 21 is fixedly supported within the casing 21 made of resin. The image sensor 2a is connected to the clock generator 3 via the electric leads (not shown) so that periodic clock pulses are applied from the clock generator 3 to activate the light responsive elements one by one. Each light responsive elements, when activated by one of the clock pulses, produces an electric signal the magnitude of which changes in correspondence with the density of light applied thereto. The image sensor 2a is further connected to the amplifier 4 via the electric leads so that electric signals produced sequentially from the light responsive elements are received by the amplifier 4.

A pair of lamps 2b are fixedly supported close to the parallel side walls of the casing 21 for projecting light toward the open side of the casing 21 through respective slit members 2c. As clearly shown in FIG. 2B, the slit members 2c encasing the lamp 2b therein have respective slits extending in parallel with the light responsive elements of the image sensor 2a. Since the light projected from the lamps 2b are allowed to pass only through the slits of the slit members 2c, illuminated area of the record medium 1 is limited. A stationary member 2d the inner surface of which is longitudinally threaded is fixedly supported between the slit members 2c within the casing 21. A movable member 2e the outer surface of which is longitudinally threaded is engaged with the stationary member 2d. A through hole 2e' is provided at the longitudinal center of the movable member 2e to allow the light to pass therethrough. The movable member 2e thus functions as an iris diaphragm. A slit 2e" engageable with a screw driver (not shown) is provided on the movable member 2e so that the stationary member 2e is rotated by the screw driver to move longitudinally relative to the stationary member 2d. The movable member 2e supports a lens 2f which converges the light passing through the hole 2e' on the light responsive elements of the image sensor 2a.

The guide 23 engaged with the casing 21 at the open side thereof is provided with a pair of parallel side walls 2h which are made of resin and extend equally from the parallel side walls of the casing 21 in a direction orthogonal to the light responsive elements of the image sensor 2a. The side walls 2h are spaced from each other to encompass the bar codes 1a therebetween when the free end portions thereof are contacted with the record medium 1. The guide 23 is devoid of another parallel side walls (right and left side walls in FIG. 2A) so that the light projected from the lamps 2b is transmitted therethrough and the light reflected by the bar codes 1a of the record medium 1 is transmitted toward the lens 2f therethrough. The side walls 2h define a scanning region available for the image sensor 2a.

Figure 3:
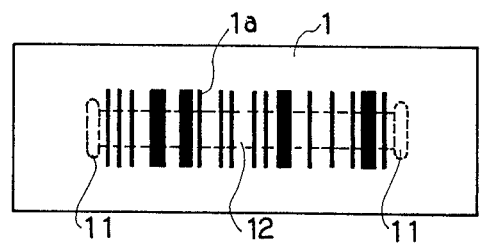
FIG. 3 is a plan view illustrating bar codes which is to be scanned.

The bar codes 1a which are to be scanned are exemplarily illustrated in FIG. 3. The bar codes 1a comprises four bar codes each of which is recorded according to a well-known TWO OUT OF SEVEN COMBINATIONS. Each bar code consists of seven parallel bar symbols which are recorded in black and in white alternately. Two and five bar symbols among the seven bar symbols have respective wide and narrow widths, whereas all of the seven bar symbols have uniform bar length. Each bar code starting from and ending in black bar symbols is spaced from adjacent bar codes by a predetermined width equal to the wide bar width.

The bar codes 1a thus recorded on the record medium 1 are scanned in the following manner. The scanner 2 carried by an operator is brought into contact with the record medium 1. With the free end portions of the side guide walls 2h of the scanner 2 being in contact with the record medium 1, the position of the scanner 2 relative to the record medium 1 is adjusted such that the side guide walls 2h encompasses the bar codes 1a therebetween. This position adjustment can be attained with ease, since it can be observed through the space formed between the side guide walls 2h whether the free end portions of the side guide walls 2h are positioned beside the bar codes 1a. With the most desirable contact position of the side guide walls 2h shown by phantom forms 11 in FIG. 3, the side guide walls 2h are in parallel relation with the bar symbols of the bar codes 1a. On this occasion, the light projected from the lamps 2b illuminates the record medium 1. Since the projected light passes through the slits of the slit members 2c and along the side guide walls 2h, the illuminated area is limited to transverse the bar symbols of the bar codes 1a as shown by a phantom form 12 in FIG. 3. The illuminated portion 12 indicates the scanning line along which the image sensor 2a scans the bar codes 1a. The light illuminating a portion of the record medium 1 is reflected by the bar symbols of the bar codes 1a. The reflected light, passing through the hole 2e' of the movable member 2e and the lens 2f, is received by the image sensor 2a. Since the bar symbols are recorded in white and in black which are contrastive colors in light reflectivity, the reflected light has corresponding light densities. The image sensor 2a having light responsive elements which are activated sequentially by the clock generator 3 produces electric signals the magnitudes and the time periods of which respectively indicate the colors and the widths of the bar symbols.

Figure 4:
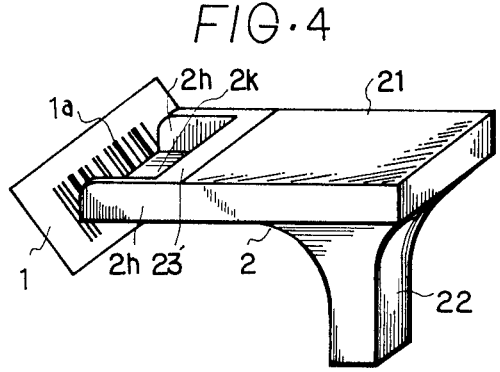
FIG. 4 is a schematic view illustrating the second embodiment of a bar code scanner according to the invention.

The bar code scanner 2 may be modified as shown in FIG. 4. This second embodiment differs from the first embodiment in that the guide 23' is provided with a bottom wall 2k in addition to the parallel guide walls 2h. The bottom wall 2k is formed to define a straight line connecting the free end portions of the guide walls 2h. The straight line formed by the bottom wall 2k in parallel relation with the light responsive elements of the image sensor 2a indicates the scanning line of the image sensor 2a. This bottom wall 2k enables the operator to bring the scanner 2 into proper contact with the record medium.

Figure 5:
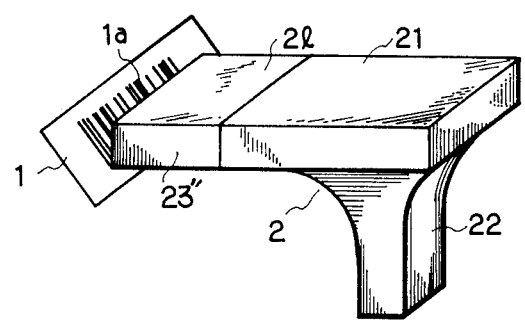
FIG. 5 is a schematic view illustrating the third embodiment of a bar code scanner according to the invention.

The bar code scanner 2 may be modified further as shown in FIG. 5. This third embodiment differs from the first and second embodiments in that the guide 23″ is further provided with a top wall 21. The guide 23″ comprising a pair of side walls 2h and bottom and top walls 2k and 21 is made of transparent resin so that the operator may observe the bar codes 1a through the transparent guide 23″.

The present invention is not limited to the embodiments described hereinabove but may be modified or altered in many ways without departing from the spirit of the invention.

What I claim is:

1. In a system for scanning a bar code or bar codes having a plurality of parallel bar symbols recorded in contrastive light reflective colors, a bar code scanner comprising:
   a casing;
   a pair of side guide members extending in parallel with each other from said casing by a uniform length, said side guide members being spaced from each other to encompass said parallel bar symbols therebetween and defining a scan line, said scan line being visually observable at least in the regions thereof adjacent the top portions of said side guide members to facilitate proper positioning of the scanner along the bar code; and
   an image sensor supported within said casing and having a plurality of light responsive elements arranged in a transverse relation with said side guide members, said light responsive elements being activated one by one to convert reflected light applied from said parallel bar symbols through the space defined by said side guide members into responsive electric signals.

2. A bar code scanner according to claim 1 further comprising:
   a bottom guide member extending from said casing to connect the bottom portions of said side guide members therethrough, said bottom guide member forming a straight line at the end portions of said side guide members.

3. A bar code scanner according to claim 1 or 2 further comprising:
   light projector means supported within said casing at an intermediate portion between said side guide members and said image sensor for projecting light toward the space defined by said side guide members; and
   a lens supported within said casing at another intermediate portion between said side guide members and said image sensor for converging said reflected light on said light responsive elements of said image sensor.

4. A bar code scanner according to claim 3 further comprising:
   slit means supported within said casing at a portion intermediate between said guide members and said light projector means, said slit means having a slit extending in orthogonal relation with said side guide members.

5. In a system for scanning a bar code or bar codes having a plurality of bar symbols recorded in different light reflective colors, a bar code scanner comprising:
   a casing;
   a pair of side guide members extending in parallel with each other from said casing by a uniform length, said side guide members being spaced from each other to encompass said parallel bar symbols therebetween and defining a scan line, said scan line being visually observable at least in the regions thereof adjacent the top portions of said side guide members to facilitate proper positioning of the scanner along the bar code;
   a transversal guide member connecting at least the end portions of said side guide members such that said transversal guide member transverses said parallel bar symbols when the end portions of said side guide members are positioned to encompass said parallel bar symbols; and an image sensor supported within said casing and having a plurality of light responsive elements arranged in parallel with said transversal guide member, said light responsive elements being activated one by one by periodic pulses to scan said parallel bar symbols.

* * * * *